Oct. 11, 1932.  O. J. W. LOUGHEED  1,881,761
WELDING CLAMP
Filed Nov. 6, 1929
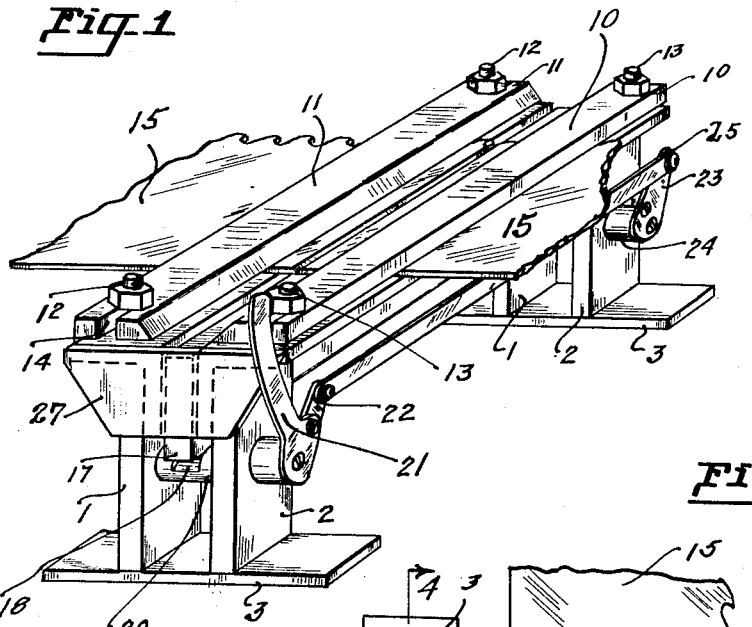
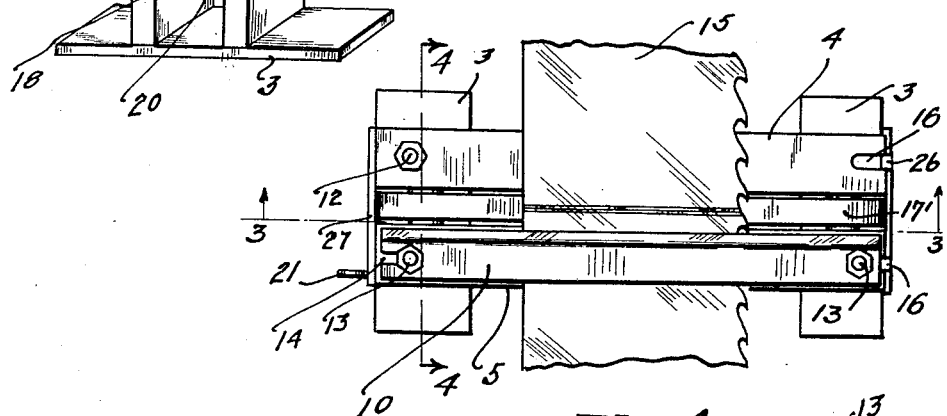
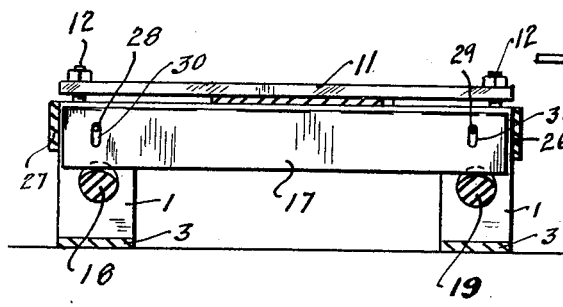
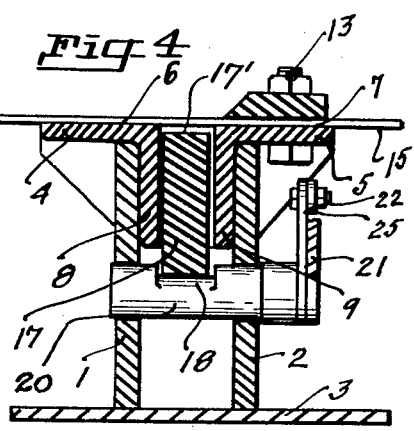
Overend J. W. Lougheed
INVENTOR
BY Thomas Belyea
ATTORNEY Patented Oct. 11, 1932

1,881,761

UNITED STATES PATENT OFFICE

OVEREND J. W. LOUGHEED, OF PORTLAND, OREGON

WELDING CLAMP

Application filed November 6, 1929. Serial No. 405,268.

The primary purpose and object of my new and improved saw clamp is to provide a tool with which to weld or recondition, band saws. The invention in its simplest form consists of a frame having a bed provided with means for clamping saws thereon. An anvil whose upper face constitutes a section of the bed is mounted within the frame and is adapted for being raised or lowered, into or out of engagement with the under side of the saw blade.

The primary object of my invention consists in providing a relatively light saw clamp that may be placed upon the bench or work table of the sawsmith wherein the welding is effected between parallelly disposed clamps and wherein the anvil for the hammering of the blade may be raised into intimate engagement with the underside of the blade immediately after the welding has been effected in order to complete or perfect fusion by forging or hammering.

A further object of my invention consists in providing simple means for admitting the blade to be joined into the clamp and for removing the blade quickly and easily after the weld has been effected.

A further object of my invention resides in a construction that is of relatively light weight, that is efficient in its operation and that may be utilized as a portable welding clamp and anvil for the repairing of relatively large saws.

Heretofore it has been the general custom to ship or transport the saws to a repair plant wherein the same are reconditioned by brazing, but through the use of this clamping device, it is now possible to perform the weld on the floor of the mill, or in the filing room. The reconditioning is done by welding the edges together or for reconditioning that portion of the saw that has cracks therein without the removal of the saw from the mill premises. I have found that the use of the clamp, as herein illustrated and described, greatly lessens the amount of time necessary in the welding operation and greatly lessens the amount of heat that is to be applied to the weld. This is made possible through the ease with which the anvil may be brought into intimate engagement with the blade after the fusion is effected.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective, end view of the device illustrating the saw blade in position within the clamp and illustrating the anvil in raised position to bring the same into intimate engagement with the under side of the blade to be welded.

Fig. 2 is a top, plan view of the mechanism illustrated in Fig. 1.

Fig. 3 is a longitudinal, sectional view of the assembled device, the same being taken on line 3—3 of Fig. 1, looking in the direction indicated.

Fig. 4 is a vertical, sectional view of the assembled device, the same being taken on line 4—4 of Fig. 2 looking in the direction indicated.

Like reference characters refer to like parts throughout the several views.

This invention, as will be seen on examination of the drawing, is in the nature of an oblong frame or table provided with two spaced supporting posts or legs 1 and 2 at each end thereof. Each pair of end legs 1 and 2 is provided with a base plate or footing 3 upon which they stand. Mounted to the upper end of legs 2 and extending therebetween is a horizontal bed plate 5 which is provided with a downwardly directed portion or guide plate 9 secured to the inner sides of legs 2. Legs 1 likewise have mounted to their upper ends a horizontal bed plate 4 similar to member 5. Plate 4 has a downwardly directed portion or guide plate 8 which is secured to the inner sides of the legs 1. Guide plates 8 and 9 are arranged parallel one another and are located a sufficient distance apart to provide a well therebetween to accommodate an anvil 17. Proper bracing between the upper ends of the paired legs and the respective guide plates is secured by transverse plates 26 and 27, one at one end of the frame and the other at the opposite end. The upper faces 6 and 7 of the respective bed plates 4 and 5 are arranged in the same horizontal plane, and together with the upper face 17' of anvil 17 form what is herein termed a bed. The legs, footings, bed plates and transverse plates are cooperatingly connected to form the frame by bolts, rivets or by welding, in this instance the connecting elements are welded.

Anvil 17 is an elongated member having its opposite sides parallelly arranged to enable it to ride between the guide plates 8 and 9. The region between plates 8 and 9 occupied by anvil 17 is here termed a well, and the dimensions of the anvil are such that it may be freely raised or lowered therein. Provision is made for supporting, raising or lowering the anvil in its well, which is in the nature of a pair of eccentric or cam shafts. These shafts, 20 and 24 respectively, mounted for rotation, one through each pair of legs 1 and 2, are provided with intermediate depressed cam faces 18 and 19 respectively upon which anvil 17 rides. When shafts 18 and 19 are rotated until anvil 17 rides on the full faces thereof, it will have been raised to a position where its upper face 17' is flush or continuous with the upper faces 6 and 7 of the bed plates 4 and 5. On the other hand when the shafts are rotated so that the anvil rides on cam faces 18 and 19 the anvil will have been lowered in the well and its face 17' will have been positioned below the level of the bed.

In order to operate the two shafts in unison, a link and arm mechanism is provided between the two, and for this purpose an arm 22 is secured to shaft 20, an arm 23 is secured to shaft 24, and a link 25 is pivotally connected between the free ends of the two arms. A hand lever 21 secured to shaft 20 and arm 22 provides means for rotating the two shafts.

From the foregoing description it will be apparent that the present invention has the characteristics of a table or bench, having an upper plane surfaced portion constituting the heretofore referred to bed. As indicated this table is used in connection with repairing saws, and for this purpose it is absolutely essential that the faces of the two saw ends be positioned in the same plane in order to avoid kinks in the region of such weld, and for that purpose the upper surface or bed has been provided with a horizontal plane surface.

A particular class of welding for which this invention is well suited is the uniting of disassociated saw members, such as individual saw portions, or the end portions of an elongated saw blade, for the purpose of transforming it into an endless or band saw. For the purpose of illustrating such use, the drawing shows two saw members 15 which are to be joined by what is termed a butt weld. For this purpose the end edges are trued or ground and then arranged in opposition to each other as shown, but in doing so the lateral edges are held in correct alignment. In order to secure the saw members in this position, clamping members are provided which are in the nature of two plates or bars 10 and 11. These are secured upon the upper faces of the saw blades by means of bolts 13 and 12 respectively which draw them toward the face of the bed. It is obvious that when the nuts or bolts 12 and 13 are threaded down, bars 10 and 11 will bear upon the saw members and secure them against movement on the bed. One end of each of the clamping members is provided with a notch 14 to allow it to be withdrawn from the bolt securing such end, while the bolt securing its other end may be slipped from its seat in the bed plate by moving it out of the notch 16 in such bed plate, thereby allowing the clamping members to be removed from the bed by merely moving them endways, or to the right looking at Figure 2, and by reversing the movement, securing them to the bed. It is to be understood that the clamping members provide means for firmly securing the saw members against movement during the process of welding, which is done by threading down nuts on bolts 12 and 13.

The present invention is particularly useful in welding processes having alternating steps of fusing and forging. During the interval of fusing the anvil is lowered through manipulation of lever so that its upper face 17' is positioned below the lower face of the saw, such position providing a substantial spacing between it and such saw. However during the step in which the fused region is forged, the anvil is raised until its face is flush with the upper surface of the bed, in which position those portions of the saw blades which are being operated upon rest upon the face 17'. Anvil 17, of course, is of substantial construction in order to resist the hammer blows during forging. During the continuation of the process of welding the blades, anvil 17 is raised and lowered in accordance with the two foregoing steps.

In order to overcome the likelihood of anvil 17 dropping out of its well when the table is inverted, it is provided with two transverse slots 30 and 31 through which extend pins 28 and 29 respectively. These pins are secured to the guides plates 8 and 9.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of base plates, leg supports superposed thereon and welded thereto, angle bars disposed parallelly and in spaced relationship upon the legs to form a table of the horizontal portion of the angles, clamping bars adjustably and removably secured to the angle bars, shafts journaled within the legs and a camming surface disposed centrally of the shafts and within that portion of the shafts lying between the leg elements, an anvil disposed upon the camming surfaces and means for actuating each of the shafts to raise and lower the anvil into and out of working position.

2. A welding clamp including a frame having a pair of spaced legs at each end thereof and provided with a plane surfaced portion constituting a bed, a rotatable cam shaft carried by each pair of legs, there being a well in said bed, a member occupying said well and supported by the aforesaid cam shafts, said member having an upper face normally continuous with and forming a part of said bed, and said cam shafts being so arranged that when they are rotated in unison said member moves downward to a position wherein its upper face is spaced beneath said bed.

OVEREND J. W. LOUGHEED.